UNITED STATES PATENT OFFICE.

EUGEN HORNUNG AND RUDOLF LIEBL, OF VIENNA, AUSTRIA-HUNGARY.

COMPOUND AS SUBSTITUTE FOR CAOUTCHOUC, GUTTA-PERCHA, OR THE LIKE.

SPECIFICATION forming part of Letters Patent No. 656,191, dated August 21, 1900.

Application filed June 1, 1895. Serial No. 551,381. (No specimens.)

*To all whom it may concern:*

Be it known that we, EUGEN HORNUNG and RUDOLF LIEBL, subjects of the Emperor of Austria-Hungary, residing at Vienna, in the Province of Lower Austria, in the Empire of Austria-Hungary, have invented certain new and useful Improvements in a Compound as a Substitute for Caoutchouc, Gutta-Percha, or the Like, (for which we have obtained Letters Patent in Great Britain, dated September 7, 1894, No. 17,070, and in Spain, dated January 18, 1896, No. 18,159;) and we do hereby declare the following to be a full, clear, and exact description of the invention, such as will enable others skilled in the art to which it appertains to make and use the same.

Our invention has relation to the manufacture of rubber substitutes; and it consists of a composition of matter composed, essentially, of a mixture of glue insoluble in water and a relatively-small proportion of rubber or a substitute of such, with or without a filler, as hereinafter more fully described.

In Letters Patent, dated September 7, 1894, No. 17,070, granted to us in Great Britain, we have described a rubber substitute, suitable for waterproofing purposes, of the composition above set forth, and we have since found that this compound not only possesses the essential properties of caoutchouc and gutta-percha, but also the properties of all rubber-like substances or compounds, and can therefore be used for all purposes for which these substances have heretofore been used. It is, furthermore, much cheaper and practically inodorous and in its various uses can be treated in the same manner as india-rubber. Inasmuch as the proportion of rubber in the compound is very small as compared with the proportion of glue, the cost of which is comparatively low, we are enabled to produce a substitute at very low cost as compared with the cost of rubber, and inasmuch as well-known rubber substitutes can be used with equally good results the cost of the product can be still further reduced.

In the production of the rubber substitute not only "india-rubber," properly so called, but any one of the substitutes thereof are available, as well as any kind of animal glue or a substitute thereof. Among the substitutes of india-rubber we may mention Walton's substitute, consisting of linseed-oil and shellac; the Sorel substitute, consisting of colophony, asphalt, oil of rosin, calcium hydrate, gutta-percha, and clay or alumina, or of calcium hydrate, coal-tar, clay or alumina, and gutta-percha; also the vulcanized substitute obtained from copal-gum and rosin-oil; also balata, Sumatra and Gethea-Lahoe wax, and carobia.

As stated, any animal glue is available for the production of our rubber substitute, as the glue obtained from mammals and fish, from fibrin, &c.

In view of the fact that those gums known under the generic name of "india-rubber," as well as the substitutes thereof, and all animal glues and their substitutes are available for the production of our rubber substitute we will hereinafter refer to them by the generic terms of "rubber" and "glue," respectively, the term "rubber" being intended to comprehend within its meaning not only india-rubber, but its substitutes, and the term "glue" being intended to comprehend within its meaning all animal glues or their substitutes.

In carrying out our invention we prepare an aqueous solution of glue, from which the latter is precipitated in the form of a body insoluble in water by any suitable precipitant—as, for instance, by means of tannic acid, alum, or chlorin. Tungstate of soda can be added to the glue solution, in which case we use muriatic acid as a precipitant. The precipitate insoluble in water thus produced is intimately mixed with about five per cent. of rubber, the proportion of the latter relatively to the glue precipitate varying according to the nature or composition of the rubber, the glue forming in all cases the chief ingredient. Hence the cheapness of the product, especially when one of the cheaper substitutes of india-rubber is used. The admixture of the two ingredients can be effected by any well-known means, as in well-known mixing or kneading machines, the compound being rendered sufficiently plastic to effect an intimate admixture. The product as it leaves the mixer is in a more or less tacky or viscous state and is then freed from any water it may contain by evaporation and finally dried.

The product has not only a close resemblance to india-rubber, but, as above stated, has its essential properties and can be used for all purposes for which india-rubber has heretofore been and is now used. It can be vulcanized or rendered more or less fluid by means of any rubber solvent, as benzene, and used as a waterproofing for fibrous materials, as textiles, paper, and other fibrous materials, or as a waterproofing for other substances or bodies.

The conversion of the substitute from a solid to a more or less fluid state can be facilitated by the addition and admixture of vaseline, fats, oils, and analogous substances. It is available for the manufacture of hard or more or less elastic articles. It can be mixed with a vehicle or filler, either of a mineral, vegetable, or animal nature, such as loose fibers, hair, starch, or the like, earthy substances, as alumina pigments, lime, minium, chalk, and the like, also with sulfur and its compounds and with substances obtained by chemical decomposition or reaction, as celluloid, in fact with all substances with which india-rubber has heretofore been mixed or combined.

Having thus described our invention, what we claim as new therein, and desire to secure by Letters Patent, is—

1. A rubber substitute consisting essentially of a mixture of rubber, and glue rendered insoluble in water prior to such admixture, in about the proportions specified, for the purposes set forth.

2. A rubber substitute consisting essentially of a vulcanized compound of rubber, and glue rendered insoluble in water before compounding with the rubber, for the purposes set forth.

In testimony whereof we affix our signatures in presence of two witnesses.

EUGEN HORNUNG.
RUDOLF LIEBL.

Witnesses:
HARRY BELMONT,
JOSEF ZEHETNER.